United States Patent
Sun et al.

(10) Patent No.: US 9,294,302 B2
(45) Date of Patent: Mar. 22, 2016

(54) NON-FRAGMENTED IP PACKET TUNNELING IN A NETWORK

(71) Applicants: Yi Sun, San Jose, CA (US); Meng Xu, Los Altos, CA (US); Choung-Yaw Michael Shieh, Palo Alto, CA (US)

(72) Inventors: Yi Sun, San Jose, CA (US); Meng Xu, Los Altos, CA (US); Choung-Yaw Michael Shieh, Palo Alto, CA (US)

(73) Assignee: VARMOUR NETWORKS, INC., Santa Clara, CA (US)

( * ) Notice: Subject to any disclaimer, the term of this patent is extended or adjusted under 35 U.S.C. 154(b) by 192 days.

(21) Appl. No.: 13/847,881

(22) Filed: Mar. 20, 2013

(65) Prior Publication Data

US 2013/0250956 A1   Sep. 26, 2013

Related U.S. Application Data

(60) Provisional application No. 61/685,673, filed on Mar. 22, 2012.

(51) Int. Cl.
*H04L 12/46* (2006.01)
*H04L 29/06* (2006.01)

(52) U.S. Cl.
CPC ........... *H04L 12/4633* (2013.01); *H04L 69/166* (2013.01)

(58) Field of Classification Search
None
See application file for complete search history.

(56) References Cited

U.S. PATENT DOCUMENTS

| | | | |
|---|---|---|---|
| 6,970,459 B1* | 11/2005 | Meier | 370/389 |
| 7,742,414 B1* | 6/2010 | Iannaccone et al. | 370/231 |
| 8,259,571 B1* | 9/2012 | Raphel et al. | 370/230 |
| 8,798,055 B1* | 8/2014 | An | 370/390 |
| 2002/0031103 A1* | 3/2002 | Wiedeman et al. | 370/316 |
| 2004/0062204 A1* | 4/2004 | Bearden et al. | 370/250 |
| 2005/0201343 A1* | 9/2005 | Sivalingham et al. | 370/338 |
| 2006/0050696 A1* | 3/2006 | Shah et al. | 370/389 |
| 2007/0019621 A1* | 1/2007 | Perry et al. | 370/352 |
| 2009/0268667 A1* | 10/2009 | Gandham et al. | 370/328 |

* cited by examiner

*Primary Examiner* — Hassan Kizou
*Assistant Examiner* — Tejis Daya
(74) *Attorney, Agent, or Firm* — Blakely, Sokoloff, Taylor & Zafman, LLP

(57) ABSTRACT

A method and apparatus is disclosed herein for IP packet tunneling in a network. In one embodiment, the method comprises receiving, at a first network device, a first IP packet of a IP connection; creating a second IP packet by replacing information in a field in the first IP packet with a session ID identifying the IP connection; and forwarding, by the first network device, the second IP packet to the second network device in the distributed network environment.

18 Claims, 6 Drawing Sheets

| Bit Offset | 0-3 | 4-7 | 8-13 | 14-15 | 16-18 | 19-31 |
|---|---|---|---|---|---|---|
| 0 | Version | Internet Header Length | Differentiated Services Code Point | Explicit Congestion Notification | Total Length | |
| 32 | Identification | | | | Flags | Fragment Offset |
| 64 | Time to Live | | Protocol | | Header Checksum | |
| 96 | SESSION ID | | | | | |
| 128 | SESSION ID and Extra Control Information | | | | | |
| 160 | Options (if Header Length > 5) | | | | | |
| 160 or 192+ | Data | | | | | |

FIG. 3

NON-FRAGMENTED IP PACKET TUNNELING IN A NETWORK

PRIORITY

The present patent application claims priority to and incorporates by reference the corresponding provisional patent application Ser. No. 61/685,673, titled "Distributed Computer Network Layer Zone Based Security Architecture," filed on Mar. 22, 2012.

FIELD OF THE INVENTION

Embodiments of the present invention relate to the field of network communication; more particularly, embodiments of the present invention relate to communication of IP packets between network devices in a distributed network environment.

BACKGROUND OF THE INVENTION

Tunneling is commonly used in IP communication and involves routing a data packet to the appropriate network node through an intermediate address (e.g., an Internet IP address). Typically, a data packet with network routing is encapsulated by IP address information. Encapsulation involves adding an outer IP header to the original IP header fields. The outer IP header contains a source and destination IP address, while the inner IP header source and destination addresses identify the original source and destination addresses, which remain unchanged. The inclusion of the output IP header alters the original IP routing by delivering the data packet to an intermediate destination node, where it is decapsulated or de-tunneled, thereby yielding the original data packet and routing. The packet is then delivered according to the destination address found in the original IP header address fields.

During transmission, the encapsulated transmission packets may be transmitted through multiple devices. There may be limitations on the size of the packets that can be transmitted. For example, in a high-speed IP network, the sizes of IP packets are limited by the MTU (Minimum Transmission Unit) of the lower layer network. Because the size of the encapsulated transmission packets is not fixed, the size may exceed these packet size limitations (e.g., exceed the MTU of the network).

In a distributed network environment, forwarding IP packets through tunnels with additional control information among all of the devices is commonly done. However, in a high-speed network, the overhead introduced by inserting additional control information can be significant. One of the major sources of the large overhead is the IP packet fragmentation. IP packet fragmentation may be used to comply with the maximum size requirements for the packets. That is, in order to comply with these maximum size requirements, the various nodes on the transmission path may fragment the encapsulated transmission packets into separate smaller sized packets that can be transmitted between nodes on the transmission path in compliance with the maximum packet size limitations. In fact, adding extra control information on top of an IP packets will likely cause the IP packets to be fragmented by lower layer network Fragmentation performed by nodes in the transmission path often requires that further encapsulation headers be added to the fragmented packets, which introduces additional overhead and consumes additional system resources to assemble and transport such fragmented packet transmissions. Thus, fragmentation performed by the internal nodes in the transmission path can significantly increase the overhead and use of system resources.

SUMMARY OF THE INVENTION

A method and apparatus is disclosed herein for IP packet tunneling in a network. In one embodiment, the method comprises receiving, at a first network device, a first IP packet of a IP connection; creating a second IP packet by replacing information in a field in the first IP packet with a session ID identifying the IP connection; and forwarding, by the first network device, the second IP packet to the second network device in the distributed network environment.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3 illustrates one embodiment of an IP header of a forwarding packet.

DETAILED DESCRIPTION OF THE PRESENT INVENTION

Figure 1:
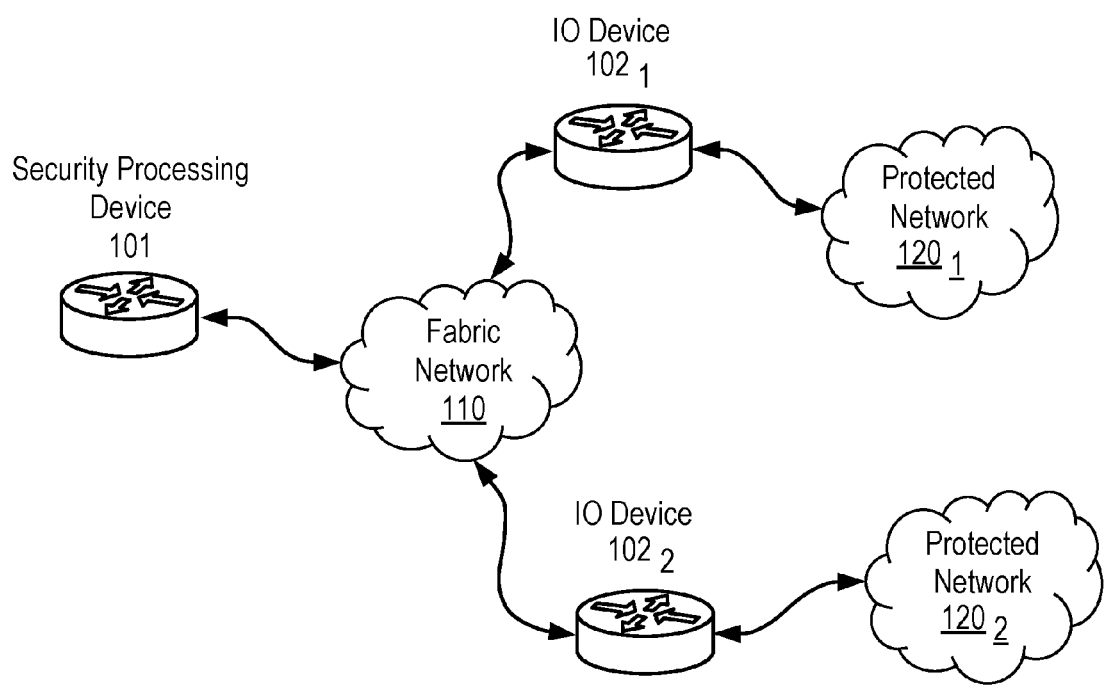
FIG. 1 illustrates a perspective view of one embodiment of a distributed network environment.

A method and apparatus for communicating non-fragmented packets in a distributed network are described. In one embodiment, the non-fragmented packets are IP packets that are transferred as part of IP packet tunneling in a layer 2 network.

Embodiments of the present invention include a mechanism in a distributed network environment that avoids IP packet fragmentation when injecting additional control information into IP packets. Multiple devices in the distributed architecture cooperate to share and forward control information to one or more devices. Often the control information is forwarded on a separate IP connection. Ideally, the control information should be forwarded with data packets to avoid synchronization issues between the data packets and control information. However, attaching the control information with the data packets can increase the packet size, thereby causing packet fragmentation and poor performance. The techniques disclosed herein allow additional control information to be forwarded for each IP connection on each device to avoid IP packet fragmentation when adding control information into IP packets.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 illustrates one embodiment of a distributed network environment. Referring to FIG. 1, the distributed network environment includes one or more security processing devices and one or more I/O devices. Security processing device 101 is coupled to fabric network 110 and performs one or more security operations on packets being transferred between devices in the network. The security operations may include security inspection of IP packets. I/O devices $102_1$ and $102_2$ are also coupled to fabric network 110. I/O device $102_1$ is also coupled to protected network $120_1$, and I/O device $102_2$ is also coupled to protected network $120_2$. IO devices $102_1$ and $102_2$ collect IP data packets from the network that is being protected and forwards all received packets to a security-processing device, such as, for example, security processing device 101, for security inspection. After security inspection, the security device (e.g., security processing device 101) may forward the packets back to the original I/O device or another I/O device. Although only one security processing device and two I/O devices are shown, the network environment may include more or less security processing and I/O devices.

For each IP connection passing through the distributed network environment, security processing device 101 and I/O devices $102_1$ or $102_2$ remember the states of the IP connection traveling therethrough. For purposes herein, this state information is referred to as a session. The state information is stored in a session table that stores all detailed information of the IP connection, and the session information is passed among multiple devices, including security processing devices and I/O devices, to keep the session information in sync.

When forwarding packets between devices, instead of adding extra information to existing packets that end up creating a larger packet, which leads to IP packet fragmentation, a mechanism is used to forward IP packets between devices while carry extra state information, without causing IP packet fragmentation.

In one embodiment, to have IP packets be forwarded while carrying extra state information, the forwarding scheme includes two phases: the first phase is referred to herein as the Setup phase, and the second phase is referred to herein as the Forwarding phase. The packet encapsulation scheme is different in these 2 phases. During the Setup phase, original IP packets are encapsulated as setup packets. During the Forwarding phase, original IP packets are encapsulated as forwarding packets.

Figure 2:
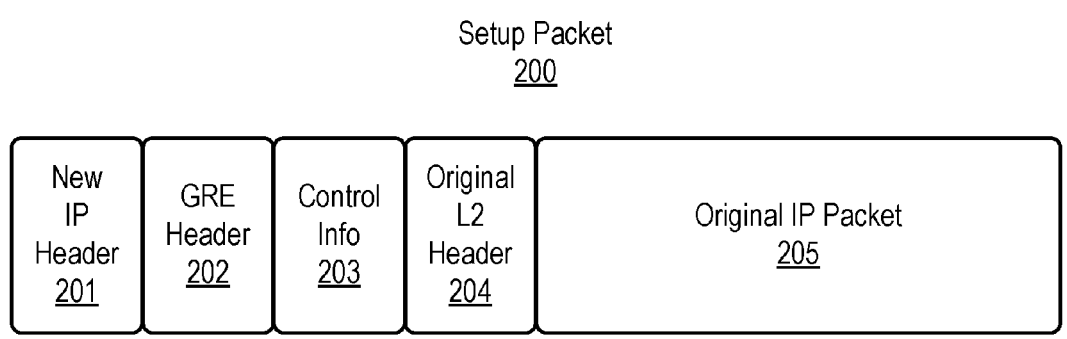
FIG. 2 illustrates one embodiment of a setup packet.

In one embodiment, when a packet reaches the distributed network devices, each IP packet is encapsulated into a setup packet during the Setup phase before it's forwarded from one device to another. In one embodiment, the setup packet is constructed as a GRE packet that includes the entire original IP packet and its layer 2 headers as the payload. FIG. 2 is one embodiment of a setup packet.

Referring to FIG. 2, original IP packet 205 and the original L2 header 204 of the original IP packet 205 are stored in the payload of setup packet 200. Setup packet 200 includes a new IP header 201 and a GRE header 202. GRE header 202 is used to carry additional control information that is used by each device to create a session. In one embodiment, the session ID and the control information 203 are inserted after GRE header 202 but before the original header. The control information could include information specifying an incoming interface, an outgoing interface, a timestamp, current CPU or memory usage, matched policy, or other information that helps the recipient device determine how to handle the new connection. In one embodiment, if GRE header 202 does not have enough space for the control information, the extra control information can be saved in the payload, either between GRE header 202 and original L2 header 204 or appended to original IP packet 205. Using original packet 205 and the additional control information, the device creates the session information which holds the runtime states and detailed information about the connection. Each session created on a device has a unique ID (identifier). When a setup packet is forwarded from one network device to another network device, the session ID is stored along with control information of the setup packet and forwarded to the receiving device. The construction of the session ID can be implementation specific, as long as it can identify a unique session among the distributed network devices.

In one embodiment, the setup packet does not exceed the MTU of the protocol (e.g., layer 2 protocol) because the packets responsible for setting up the session (e.g., the Setup packet) are shorter than the MTU even with added information. It is possible that the size of the setup packets is bigger than the MTU of the IP packets, thereby causing IP packet fragmentation. However, since the setup packets are only the first few packets of an IP connection, even if one triggers packet fragmentation, the performance impact of the fragmentation can be ignored in the most of cases.

Once the sessions are created on each device that is processing the same IP connection, the forwarding scheme enters the Forwarding phase in which the original IP packets of the IP connection are encapsulated into forwarding packets. In one embodiment, a forwarding packet is same as the original IP packet except the protocol and IP address fields (e.g., source and destination IP address fields) of IP header are used to carry the session ID and other control information. In one embodiment, the control information includes signaling information (e.g., a bit to confirm the reply, etc.), but may include other information. FIG. 3 illustrates one embodiment of a forwarding packet IP header. Referring to FIG. 3, at bit offset 0, the version, Internet header length, differentiated services code point, explicit congestion notification, and total length field are stored (inserted). At bit offset 32, the identification, flags and fragment offset fields are stored. At bit offset 64, the time to live, protocol and header checksum fields are stored. At bit offset 96 and 128, the session ID and extra control information are stored. At bit offset 160, an options field is stored, and at bit offset 160 or 192+, data is stored.

In one embodiment, the entire 64 bits of the IP address field in the IP packet is used to store the session ID and other control information. While the IP address and protocol fields are used to store the session ID and control information in one embodiment, the present invention is not limited to using those fields. In alternative embodiments, other fields may be used to store the session ID and/or control information. For example, in one embodiment, the spaces of used to specify the ports of TCP and UDP are used to store the additional control information.

The network device receiving the packet can retrieve the session ID from the IP header and recover the original packet header based on the information saved in the session. This allows obtaining the IP address port and protocol information. In one embodiment, port information of the TCP and UDP protocols could be recovered from the session information.

Note that since the forwarding packet does not change the original IP packet size, the forwarding scheme avoids IP fragmentation.

Note that only a couple packets of each connection are in the Setup phase; most of the IP packets of an IP connection are handled in the Forwarding phase. Since all the devices store the original Layer 2 and IP address information during the Setup phase, the forwarding packets can carry session ID inside the IP header among network devices, and each device uses the session ID to process the IP connection correctly.

While the forwarding scheme has been described above using a GRE header as the example of an encapsulation protocol for setup packets, one skilled in the art would recognize that any encapsulation protocols that can encapsulate layer 2 or layer 3 protocols may be used.

In one embodiment, it is assumed that the underlying networks are layer 2 networks, and the setup packets and forwarding packets are encapsulated packets and forwarded directly on a layer 2 network. The layer 2 protocols could be, but are not limited to, the Ethernet/IEEE 802.3 protocol, the Frame relay protocol, or the MPLS protocol.

Figure 4:
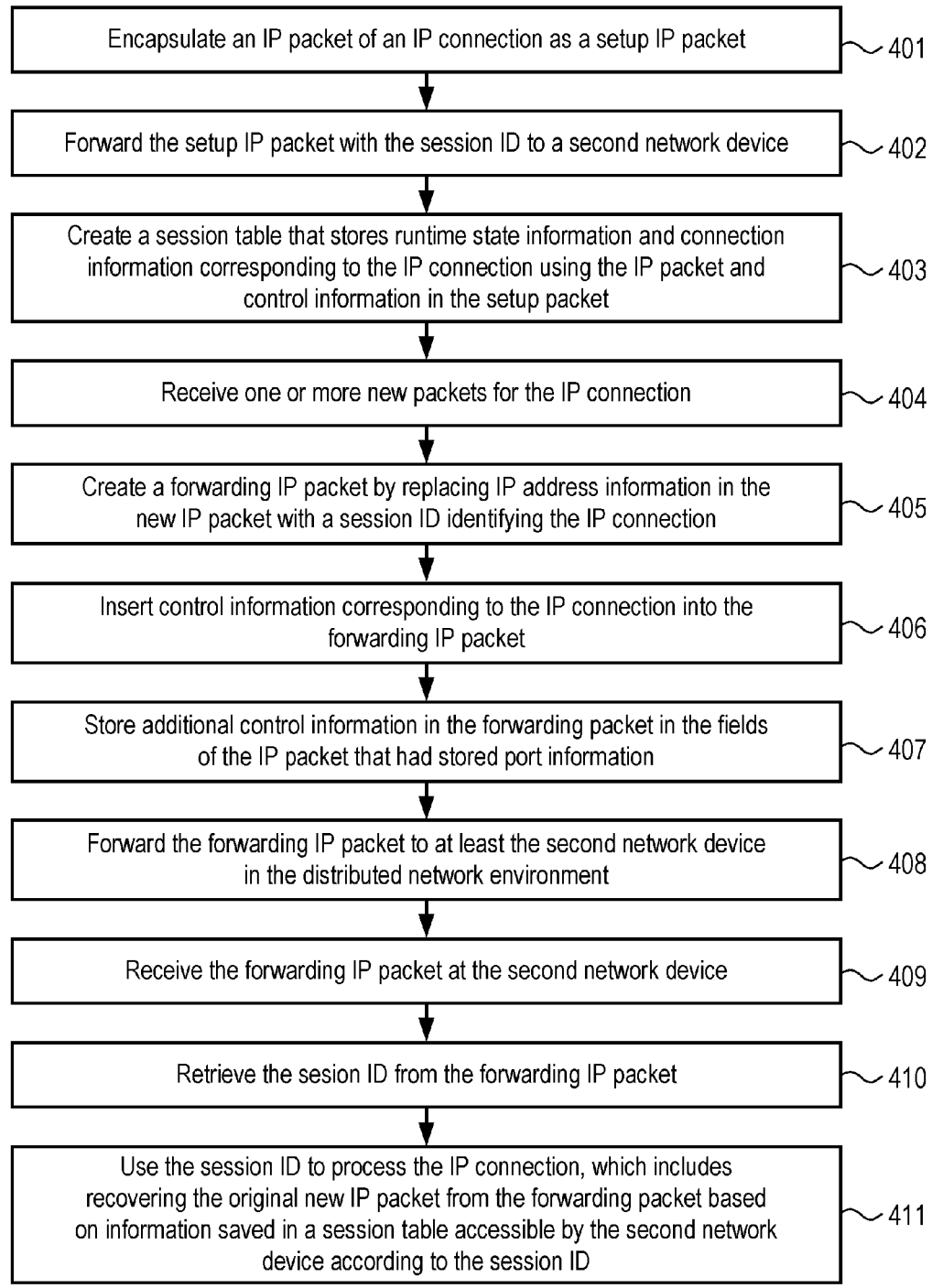
FIG. 4 is a flow diagram of one embodiment of a process for communication packets of an IP connection.

FIG. 4 is a flow diagram of one embodiment of a process for communication packets of an IP connection in a distributed network. The process is performed by processing logic that may comprise hardware (circuitry, dedicated logic, etc.), software (such as is run on a general purpose computer system or a dedicated machine), or a combination of both.

Referring to FIG. 4, the process begins by processing logic in a network device encapsulating an IP packet of an IP connection as a setup IP packet (processing block 401) and forwarding the setup IP packet with the session ID to a second network device (processing block 402).

In one embodiment, the setup IP packet comprises a GRE packet having a GRE header and a GRE payload, where the GRE payload contains the original IP packet. The GRE header contains control information to be stored in the session table of the second network device. In one embodiment, the GRE payload includes additional control information to create the session.

Next, processing logic of the second network device creates a session table that stores runtime state information and connection information corresponding to the IP connection using the IP packet and control information in the setup packet (processing block 403). In one embodiment, the setup IP packet enables the second network device to create a session table entry in response thereto that includes the session ID and IP address information (IP source and destination addresses) from the setup IP packet.

Subsequent to forwarding the setup IP packet, processing logic in the first network devices receives one or more new packets for the IP connection (processing block 404). In response to each of these new packets for the connection, processing logic of the first network device creates a forwarding IP packet by replacing IP address information in the new IP packet with a session ID identifying the IP connection (processing block 405). In one embodiment, the IP address field of the new IP packet stores the session ID and control information, instead of the source and destination IP addresses.

Processing logic optionally inserts control information corresponding to the IP connection into the forwarding IP packet (processing block 406). In one embodiment, processing logic optionally stores additional control information in the forwarding packet in the fields of the IP packet that had stored port information (processing block 407).

In one embodiment, even though information such as the session ID and control information are inserted in the new IP packet to create the forwarding packet, the forwarding packet is no larger in size than the original IP packet.

After inserting the session ID and control information, processing logic in the first network device forwards the forwarding IP packet to at least the second network device in the distributed network environment (processing block 408). In one embodiment, forwarding the second packet is performed according to one layer 2 protocol selected from a group consisting of: the Ethernet/IEEE 802.3 protocol, the Frame relay, and the MPLS protocol.

Processing logic in the second network device receives the forwarding IP packet at the second network device (processing block 409) and retrieves the session ID from the forwarding IP packet (processing block 410). Processing logic in the second network device uses the session ID to process the IP connection, which includes recovering the original new IP packet from the forwarding packet based on information saved in a session table accessible by the second network device according to the session ID (processing block 411).

One Embodiment of a Network Device

In one embodiment, the network device comprises a memory, a network interface, a network interface and a processor. The network interface receives network traffic in the form of IP packets. The processor receives the IP packet and processes them. In one embodiment, the processor is operable to receive a first IP packet, which is a modified version of an original IP packet of an IP connection which includes an additional session ID and other information that is needed to create the session, where the first IP packet is greater in size than the original IP packet; When the processor receives a subsequent IP packet of the same connection, it retrieves the session ID information from the first IP packet and processes the IP connection, including recovering the original IP packet based on information saved in the session table corresponding to the session ID information.

Figure 5:
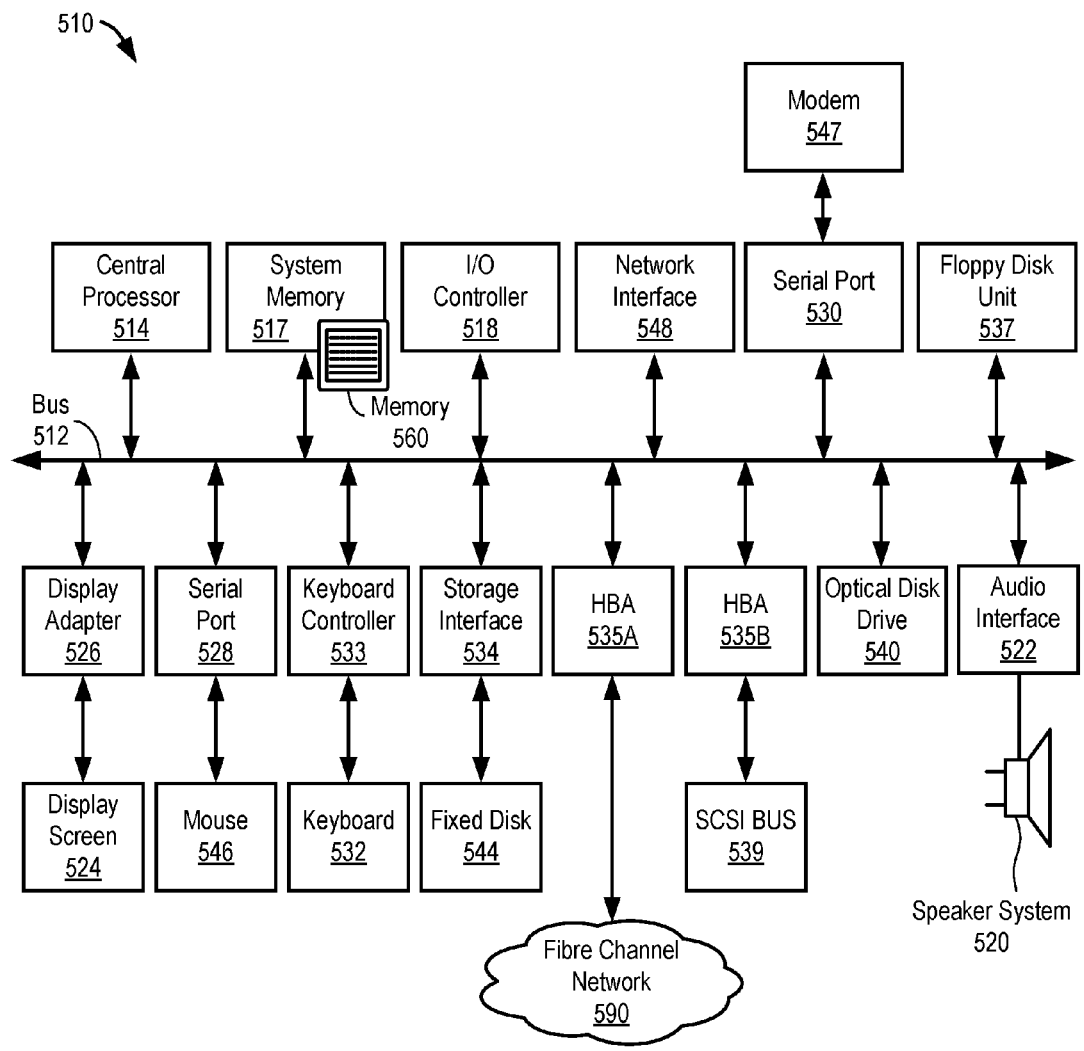
FIG. 5 is a block diagram of one embodiment of a network device.

FIG. 5 depicts a block diagram of a network device, such as those of FIG. 1. Referring to FIG. 5, network device 510 includes a bus 512 to interconnect subsystems of n510, such as a processor 514, a system memory 517 (e.g., RAM, ROM, etc.), an input/output controller 518, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517. System memory 517 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., optical drive 540), a floppy disk unit 537, or other storage medium.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems.

Modem 547 may provide a direct connection to a remote server via a telephone link or to the Internet via an internet service provider (ISP). Network interface 548 may provide a direct connection to a remote server. Network interface 548 may provide a direct connection to a remote server via a direct network link to the Internet via a POP (point of presence). Network interface 548 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 5 need not be present to practice the techniques described herein. The devices and subsystems can be interconnected in different ways from that shown in FIG. 5. The operation of a computer system such as that shown in FIG. 5 is readily known in the art and is not discussed in detail in this application.

Code to implement the network device operations described herein can be stored in computer-readable storage media such as one or more of system memory 517, fixed disk 544, optical disk 542, or floppy disk 538. The operating system provided on computer system 510 may be MS-DOS®, MS-WINDOWS®, OS/2®, UNIX®, Linux®, or another known operating system.

Figure 6:
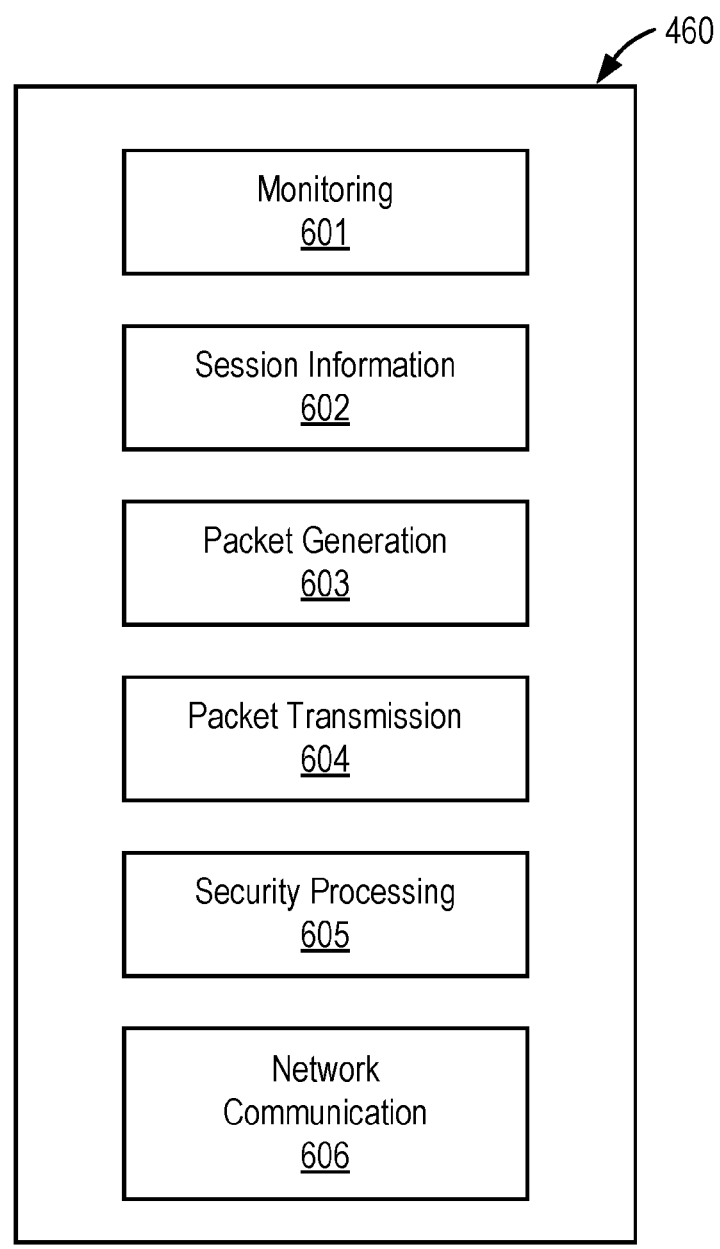
FIG. 6 illustrates a set of code (e.g., programs) and data that is stored in memory of one embodiment of a network device.

FIG. 6 illustrates a set of code (e.g., programs) and data that is stored in memory of one embodiment of a network device, such as the network device set forth in FIG. 5. The security gateway uses the code, in conjunction with a processor, to perform the necessary operations described herein.

Referring to FIG. 6, the memory 460 includes a monitoring module 601 which when executed by a processor is responsible for performing traffic monitoring of traffic from other devices in the network. The memory also stores a session information module 602 which, when executed by a processor, is responsible for storing session information and using that stored session and executed information to process an IP packet. The memory also stores a packet generation module 603 which, when executed by a processor, is responsible for generating the setup and forwarding packets described above. Memory 460 also stores packet transmission module 604, which when executed by a processor causes a packet, such as, for example, the setup and forwarding packets, to be sent to other network devices. Memory 460 also optionally includes a security processing module 605 to perform security processing on packets that are part of sessions. The memory also includes a network communication module 606 used for performing network communication and communication with the other devices (e.g., network devices, servers, clients, etc.).

As described above, the network devices in FIG. 1, may be implemented using a computer system. In one embodiment, one or more of the networks devices 101 and 102 is implemented using a system such as depicted in FIG. 5 as well, except using different code to implement the techniques and operations performed by such servers and their VMs. The code is stored in computer-readable storage medium such as system memory 517, fixed disk 544, optical disk 542 or floppy disk 548.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for transferring IP packets in a distributed network environment having at least a first network device and a second network device, the method comprising:

in response to receiving an initial IP packet of an IP connection at the first network device, encapsulating the initial IP packet of the IP connection as a setup IP packet, the setup packet comprising a GRE packet that includes a new IP header, a GRE IP header after the new IP header that stores control information to enable network devices to establish a connection for the IP connection, and a session ID identifying the IP connection stored after the GRE IP header and before the initial IP packet stored in a payload of the GRE packet;

forwarding, by the first network device, the setup IP packet to the second network device to enable the second network device to create a session table entry based on the control information within the GRE IP header in response thereto, wherein the session table entry includes the session ID and IP address information for the IP connection;

receiving, at the first network device, a first IP packet of the IP connection;

modifying the first IP packet to create a second IP packet by adding the session ID and the control information in at least one field in the first IP packet; and forwarding, by the first network device, the second IP packet to the second network device in the distributed network environment, the second IP packet being a forwarding IP packet, wherein the forwarding IP packet and the setup IP packet being different types of IP packets used within an IP session identified by the session ID.

2. The method defined in claim 1 where the information replaced in an IP address information and protocol information in the address and protocol fields respectively.

3. The method defined in claim 1 further comprising inserting control information corresponding to the IP connection into the second IP packet.

4. The method defined in claim 1 wherein the second IP packet is no larger in size than the first IP packet.

5. The method defined in claim 1 further comprising:
receiving the second IP packet at the second network device; and
retrieving the session ID from the second IP packet;
using, by the second network device, the session ID to process the IP connection, including recovering the first IP packet based on information saved in a session table accessible by the second network device according to the session ID.

6. The method defined in claim 1 wherein the setup IP packet comprises the GRE packet having a GRE header and a GRE payload, the GRE payload containing the initial IP packet, the GRE header containing control information to be stored in the session table of the second network device.

7. The method defined in claim 6 wherein the GRE payload includes additional control information to create the session.

8. The method defined in claim 1 further comprising creating a session table that stores runtime state information and connection information corresponding to the IP connection using the initial IP packet and control information in the setup IP packet, the runtime state information and connection information stored in the session table comprise at least a session identifier, an IP source address from the setup IP packet, and an IP destination address from the setup IP packet.

9. The method defined in claim 1 wherein forwarding the second packet is performed according to one layer 2 protocol selected from a group consisting of: the Ethernet/IEEE 802.3 protocol, the Frame relay, and the MPLS protocol.

10. The method defined in claim 1 wherein the IP address field stores the session ID and control information.

11. The method defined in claim 1 further comprising storing additional control information in fields of the packet that had stored port information.

12. A method for transferring IP packets in a distributed network environment, the method comprising:
receiving a setup IP packet, wherein the setup IP packet is an encapsulated version of a first IP packet of an IP connection and comprises a GRE packet having a GRE header and a GRE payload, the GRE payload containing the first IP packet, the GRE header containing new IP header, a GRE IP header after the new IP header that stores control information used to create a session for the IP connection of which the first IP packet is a part, and a session ID identifying the IP connection stored after the GRE IP header and before the initial IP packet stored in a payload of the GRE packet;

creating a session table entry in response to receiving the setup packet, including storing information corresponding to the first IP packet, including IP address information;

receiving a forwarding IP packet, which is a different type of IP packet than the setup IP packet and is a modified version of a second IP packet of the IP connection in which IP address locations carry the session ID and the control information, wherein the second IP packet is received after the first IP packet in the IP connection, and wherein the forwarding IP packet is no greater in size than the second IP packet; and retrieving the session ID and the control information from the forwarding IP packet and processing the IP connection, including recovering IP header based on information saved in the session table corresponding to the session ID information.

13. A network device for use in a distributed network environment having a plurality of network devices, the network device comprising:
a memory;
a network interface to receive IP packets; and
a processor operable to
in response to receipt of an initial IP packet of an IP connection, encapsulate the initial IP packet of the IP connection as a setup IP packet, the setup packet comprising a GRE packet that includes a new IP header, a GRE IP header after the new IP header that stores control information to enable network devices to establish a connection for the IP connection, and a session ID identifying the IP connection stored after the GRE IP header and before the initial IP packet stored in a payload of the GRE packet;

forward the setup IP packet to a second network device to enable the second network device to create a session table entry based on the control information within the GRE IP header in response thereto, wherein the session table entry includes the session ID and IP address information for the IP connection;

receive a first IP packet of the IP connection;
modify the first IP packet to create a second IP packet by adding the session ID and the control information replacing information in at least one field in the first IP packet; and forward the second IP packet to the second network device in the distributed network environment, the second IP packet being a forwarding IP packet, wherein the forwarding IP packet and the setup IP packet being different types of IP packets used within an IP session identified by the session ID.

14. The device defined in claim 13 wherein the processor is operable to insert control information corresponding to the IP connection into the second IP packet.

15. The device defined in claim 13 wherein the first IP packet is no larger in size than the second IP packet.

16. The device defined in claim 13 wherein the setup IP packet comprises the GRE packet having a GRE header and a GRE payload, the GRE payload containing the initial IP packet, the GRE header containing control information to be stored in the session table of the second network device.

17. The device defined in claim 14 wherein the GRE payload includes additional control information to create the session.

18. A computer-readable non-transitory storage medium having instructions stored therein, which when executed by a first network device, cause the first network device to perform a method comprising:

in response to receiving an initial IP packet of an IP connection at the first network device, encapsulating the initial IP packet of the IP connection as a setup IP packet, the setup packet comprising a GRE packet that includes a new IP header, a GRE IP header after the new IP header that stores control information to enable network devices to establish a connection for the IP connection, and a session ID identifying the IP connection stored after the GRE IP header and before the initial IP packet stored in a payload of the GRE packet;

forwarding, by the first network device, the setup IP packet to the second network device to enable the second network device to create a session table entry based on the control information within the GRE IP header in response thereto, wherein the session table entry includes the session ID and IP address information for the IP connection;

receiving, at the first network device, a first IP packet of the IP connection;

modifying the first IP packet to create a second IP packet by adding the session ID and the control information in at least one field in the first IP packet; and forwarding, by the first network device, the second IP packet to the second network device in the distributed network environment, the second IP packet being a forwarding IP packet, wherein the forwarding IP packet and the setup IP packet being different types of IP packets used within an IP session identified by the session ID.

* * * * *